E. A. DEMARA.
AUTOMOBILE BRAKE CONSTRUCTION.
APPLICATION FILED FEB. 3, 1916.
1,193,366.
Patented Aug. 1, 1916.
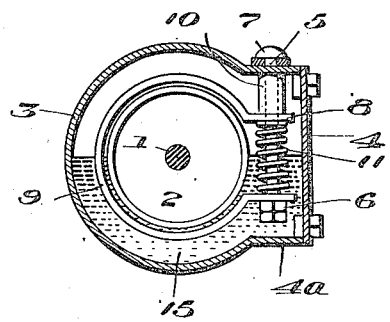
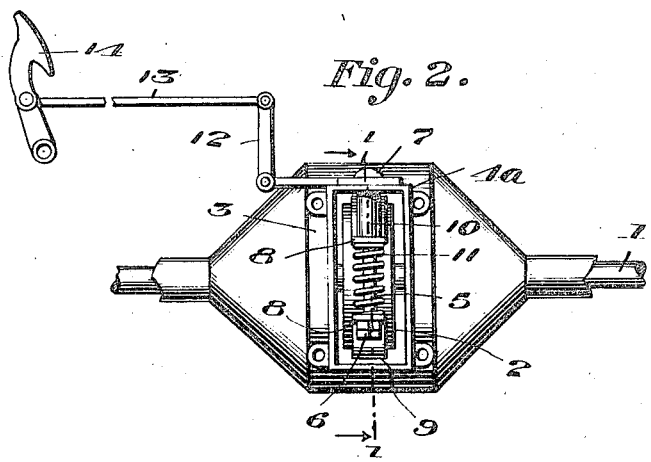

UNITED STATES PATENT OFFICE.

EUGENE A. DEMARA, OF WOONSOCKET, RHODE ISLAND.

AUTOMOBILE-BRAKE CONSTRUCTION.

1,193,366.     Specification of Letters Patent.     Patented Aug. 1, 1916.

Application filed February 3, 1916. Serial No. 76,004.

*To all whom it may concern:*

Be it known that I, EUGENE A. DEMARA, a citizen of the United States, residing at Woonsocket, in the county of Providence and State of Rhode Island, have invented new and useful Improvements in Automobile-Brake Construction, of which the following is a specification.

My present invention pertains to brakes for motor vehicles; and it contemplates the provision of a simple, efficient and quick-acting brake designed especially for use in combination with the longitudinal drive-shaft of an automobile, and constructed and arranged in such manner that it is feasible for the brake to be disposed in oil with a view to preventing the band or the band-wheel burning out incidental to hard and continued applications of the brake such as are necessary when a mountainous country is being traversed.

The invention in all of its details will be fully understood from the following description and claim when the same are read in connection with the drawings, accompanying and forming part of this specification, in which:

Figure 1 is a transverse section taken through my improved brake in the plane indicated by the line 1—1 of Fig. 2, looking in the direction of the arrow. Fig. 2 is a side elevation illustrating the brake in combination with the means I prefer to employ for applying the same.

Similar numerals of reference designate corresponding parts in both views of the drawings.

In putting my invention into effect, I fix upon the main shaft or longitudinal drive shaft 1 of a motor vehicle, a band-wheel 2, and around the shaft and the band-wheel I arrange a casing 3; the said casing being of the shape illustrated or of any other shape compatible with the purpose of my invention and being provided by preference, with a detachably-connected side plate 4, shown only in Fig. 1. It will also be noted by comparison of Figs. 1 and 2, that the casing 3 is provided with an off-set 4ª for the connection of the plate 4, and that a vertically-movable rod 5 is disposed in said off-set and extended loosely through the top wall thereof. The said rod 5 is provided at its lower end with one or more nuts 6 and at its upper end with a head 7, and is disposed in the arms 8 of a brake band 9; said arms being apertured for the reception of the rod.

Fixed with respect to and disposed below the top wall of the off-set 4ª is a sleeve 10 through which the rod 5 is movable, and loosely surrounding the rod 5 and interposed between the arms 8 of the band 9 is an expansion spring 11 which has for its function to open the brake band and normally maintain said band in a position out of engagement with the wheel 2 as illustrated in Fig. 1. The sleeve 10 serves to hold the adjacent arm 8 against movement toward the adjacent offset wall, and in that way contributes to the promptness with which the brake can be powerfuly applied.

Disposed above the off-set of the casing and below the head 7 of the rod 5 is one arm of a suitably-supported bell-crank 12, the other arm of which is connected with a link rod 13 which in turn is connected to a pedal lever 14.

As will be observed by reference to Fig. 1, the casing 3 is adapted to contain oil 15 in which the band-wheel and the band are disposed with a view to preventing burning out under hard conditions.

In the practical operation of my improved brake it will be manifest that when the brake lever 14 is pressed forwardly, the rod 5 will be moved upwardly and will operate to raise the lower arm of the band 9 against the action of the spring 11 with the result that the brake band will be quickly and powerfully applied to the wheel 2. It will also be manifest that when the lever 14 is relieved of pressure, the spring 11 by expanding will immediately open the brake band and disengage the same from the wheel.

It will be gathered from the foregoing that my novel brake acts directly upon the main shaft 1, and consequently is very effective in stopping a motor car; and it will also be gathered that the disposition of the brake mechanism in a casing is advantageous because of the capacity of the casing to hold oil in the presence of the mechanism, and also because the casing effectually prevents dirt and dust gaining access to the mechanism and in that way materially prolongs the usefulness thereof.

Having described my invention, what I claim and desire to secure by Letters-Patent, is:

The herein described motor vehicle brake comprising a shaft having a band wheel fixed thereon, a brake band surrounding the wheel and having spaced arms, a casing surrounding the wheel and band and having a lateral offset in which said arms are arranged and adapted to move; said offset being open at its outer end, a closure plate detachably connected to and closing the offset, an endwise-movable rod connected with one of said arms and extending loosely through the other arm and one end wall of said casing offset, a sleeve surrounding the rod and bearing against such other arm and said offset wall, an expansion spring surrounding the rod and interposed between the arms, and means outside the casing and connected with the rod for moving the same against the action of said spring.

In testimony whereof I have hereunto set my hand in presence of two subscribing witnesses.

EUGENE A. DEMARA.

Witnesses:
EDGAR L. SPAULDING,
CHAS. DEMARA.